(12) United States Patent
Benoit

(10) Patent No.: US 11,561,142 B2
(45) Date of Patent: Jan. 24, 2023

(54) ELECTROMECHANICAL ACTUATOR WITH INTEGRATED FORCE SENSOR

(71) Applicant: SKF MOTION TECHNOLOGIES AB, Gothenburg (SE)

(72) Inventor: Laurent Benoit, La Chavanne (FR)

(73) Assignee: SKF Motion Technologies AB, Gothenburg (SE)

( * ) Notice: Subject to any disclaimer, the term of this patent is extended or adjusted under 35 U.S.C. 154(b) by 314 days.

(21) Appl. No.: 16/903,620

(22) Filed: Jun. 17, 2020

(65) Prior Publication Data
US 2020/0400517 A1  Dec. 24, 2020

(30) Foreign Application Priority Data
Jun. 18, 2019  (FR) ..................... 1906528

(51) Int. Cl.
| | | |
|---|---|---|
| *G01L 5/00* | (2006.01) | |
| *H02K 11/20* | (2016.01) | |
| *F16H 25/22* | (2006.01) | |
| *G01L 1/22* | (2006.01) | |
| *H02K 5/173* | (2006.01) | |
| *H02K 5/22* | (2006.01) | |
| *H02K 7/06* | (2006.01) | |
| *H02K 7/08* | (2006.01) | |

(52) U.S. Cl.
CPC ........ *G01L 5/0019* (2013.01); *F16H 25/2247* (2013.01); *G01L 1/2231* (2013.01); *H02K 5/1732* (2013.01); *H02K 5/225* (2013.01); *H02K 7/06* (2013.01); *H02K 7/083* (2013.01); *H02K 11/20* (2016.01)

(58) Field of Classification Search
CPC ..... G01L 5/0019; G01L 1/2231; H02K 11/20; H02K 5/1732; H02K 7/06; H02K 7/083; F16H 25/2247
See application file for complete search history.

(56) References Cited

U.S. PATENT DOCUMENTS

| | | | |
|---|---|---|---|
| 8,253,305 B2 | 8/2012 | Sato et al. | |
| 2005/0253469 A1* | 11/2005 | Hochhalter | ............. F16H 25/20 |
| | | | 310/68 B |
| 2007/0295110 A1* | 12/2007 | Hochhalter | ......... F16H 25/2015 |
| | | | 73/862.332 |

FOREIGN PATENT DOCUMENTS

EP  2258509 A1  12/2010

* cited by examiner

*Primary Examiner* — Livius R. Cazan
(74) *Attorney, Agent, or Firm* — Laurence A. Greenberg; Werner H. Stemer; Ralph E. Locher

(57) ABSTRACT

An electromechanical cylinder contains a casing, an actuating rod mounted so as to be able to move longitudinally relative to the casing, an electric motor provided with a rotating rotor shaft, a mechanism for transforming a rotational movement of the rotor shaft of the electric motor into a linear translational movement of the actuating rod, and at least one bearing for guiding the rotor shaft of the electric motor in rotation relative to the casing and for supporting the rotor shaft. The cylinder further contains a sleeve that is fastened to the casing and inside which is mounted the bearing, and at least one load sensor that is mounted on the sleeve while being offset axially relative to the bearing.

9 Claims, 4 Drawing Sheets

ELECTROMECHANICAL ACTUATOR WITH INTEGRATED FORCE SENSOR

BACKGROUND OF THE INVENTION

Field of the Invention

The present invention relates to the field of electromechanical cylinders or actuators.

More particularly, the invention relates to the field of electromechanical cylinders that are equipped with one or a plurality of load sensors.

An electromechanical cylinder generally comprises a casing, an actuating rod mounted so as to be able to move longitudinally relative to the casing, an electric motor and a mechanism, for example of the ball screw or roller screw type, for transforming the rotational movement of the rotor of the motor into a linear translational movement of the actuating rod.

In order to guide the rotor of the electric motor in rotation and support same, a pair of rolling bearings mounted axially in abutment against one another is generally mounted at the front or rear of the casing.

In order to integrate a load sensor into an electromechanical cylinder, one solution consists in mounting this sensor against the outer ring of one of these two rolling bearings so as to be able to measure the deformation of this ring in the axial direction during movements of the actuating rod of the cylinder.

However, with this mounting, in order to measure deformation in both axial directions, the load sensor must be subjected to an axial preload which is applied to the rolling bearings during assembly. Therefore, the sensitivity of the load sensor will differ according to movements in which the actuating rod pushes a load and works in compression, and movements in which the rod pulls a load and works in tension, and will also differ according to the fastening of the electromechanical cylinder to its external surroundings.

In order to integrate a load sensor into an electromechanical cylinder, another solution consists in mounting the load sensor on a front end part of the actuating rod. For further details on this solution, reference may for example be made to the patent application EP-A1-1 587 205 (Transrol).

During the operations for assembling the electromechanical cylinder, the actuating rod is driven in rotation, which may also cause rotation of the electrical connection cable connecting the load sensor to the electronic card for processing the emitted signals. This may lead to deterioration of this cable.

Furthermore, during operation of the cylinder, the electrical connection cable moves constantly during movements of the actuating rod. This may also promote deterioration of the electrical connection cable.

BRIEF SUMMARY OF THE INVENTION

The present invention aims to remedy these drawbacks.

The subject of the present invention is an electromechanical cylinder comprising a casing, an actuating rod mounted so as to be able to move longitudinally relative to the casing, an electric motor provided with a rotating rotor shaft, a mechanism for transforming a rotational movement of the rotor shaft of the electric motor into a linear translational movement of the actuating rod, and at least one bearing for guiding the rotor shaft of the electric motor in rotation relative to the casing and for supporting the rotor shaft.

According to a general characteristic, the electromechanical cylinder also comprises a sleeve that is fastened to the casing and inside which is mounted said bearing.

According to another general characteristic, the electromechanical cylinder also comprises at least one load sensor that is mounted on the sleeve while being offset axially relative to said bearing.

Mounting the one or more sensors on an intermediate sleeve that is disposed radially between the casing and the one or more bearings, combined with the axial positioning of this or these sensor(s) such that they are offset relative to the bearing(s) makes it possible to overcome the problems related to the axial preload applied to the bearing(s) and to the deformation that may occur during assembly.

The one or more load sensors are mounted on a portion of the sleeve that is offset axially relative to the portion of the sleeve on which are mounted the one or more bearings.

The precision of the measurements obtained is greatly improved. Furthermore, the one or more load sensors can work axially in both directions while retaining the same sensitivity.

Moreover, the reliability of the cylinder over time is increased insofar as the one or more load sensors are not mounted on the sliding actuating rod thereof.

Advantageously, an annular radial clearance is provided at least between the bore of the casing and the portion of the sleeve on which are mounted said bearing and said sensor.

Thus, the axial deformation of the sleeve that may be measured by the one or more load sensors is not affected by the friction that may occur between the casing and the region of the sleeve in which are disposed the one or more load sensors and the one or more bearings. This further increases the precision of the measurements obtained.

Preferably, the sleeve comprises an axial tubular portion inside which is mounted said bearing and that supports said load sensor, and a radial flange for fastening said sleeve to the casing.

The casing may comprise a tubular main body and a front endplate and a rear endplate that are each mounted at one end of the main body, the actuating rod extending through the front endplate and said bearing being situated axially between the electric motor and the front endplate.

Advantageously, the flange of the sleeve is gripped axially between the main body and the front endplate of the casing. This makes it possible to fasten the sleeve to the casing quickly and easily. Furthermore, this also makes it possible to be able to mount the tubular portion of the sleeve in a floating manner.

For this purpose, an annular axial clearance may also be provided between the bore of the casing and the axially opposite end of the sleeve from the flange.

According to a particular design, through-openings are made in the radial thickness of the sleeve, said load sensor being disposed between two openings that succeed one another in the circumferential direction. With such a design, the deformable nature of the sleeve, and consequently a high degree of precision of the measurements obtained by the one or more load sensors, is promoted.

In one embodiment, said load sensor is mounted on the outer surface of the sleeve. Alternatively, said load sensor may be mounted in the bore of the sleeve.

The electromechanical cylinder may also comprise at least one electrical connection cable that is connected to said load sensor and mounted on the sleeve. For the sake of radial compactness, it is possible to provide for said electrical connection cable to extend at least partially inside at least one groove formed on the sleeve.

In one particular embodiment, the electromechanical cylinder may also comprise an electronic card that is connected to said electrical connection cable and mounted inside an external housing fastened to the casing.

Said rolling bearing may comprise an outer ring mounted in the bore of the sleeve, an inner ring mounted on the rotor shaft of the electric motor, and at least one row of rolling elements that are disposed between raceways formed on said rings.

Preferably, the cylinder comprises at least two rolling bearings mounted axially in contact with one another inside the sleeve. The rows of rolling elements of the bearings may be disposed in the DB or the DF configuration. In one embodiment, the one or more bearings may be of the angular-contact ball bearing type.

According to an advantageous design, the movement transformation mechanism comprises a screw that is secured to the actuation rod and provided with an external thread, and a plurality of longitudinal rollers that engage with the external thread of the screw and with an internal thread of the rotor shaft. The mechanism is of the inverted satellite roller screw type. This promotes the overall radial compactness of the electromechanical cylinder.

Alternatively, it is however possible to provide other designs for the movement transformation mechanism. This may for example comprise a screw provided with an external thread, a nut disposed around the screw, which nut comprises an internal thread and is secured to the actuation rod, and a plurality of longitudinal rollers that engage with the external and internal threads of the screw and of the nut. The mechanism is of the satellite roller screw type.

Alternatively, as a replacement for the rollers, balls may be engaged inside the external and internal threads of the screw and of the nut.

In another variant embodiment of the mechanism, it may be possible to provide for the external thread of the screw to engage directly with the internal thread of the nut.

The present invention will be better understood upon studying the detailed description of an embodiment, given by way of entirely non-limiting example and illustrated by the appended drawings.

DESCRIPTION OF THE INVENTION

Figure 1:
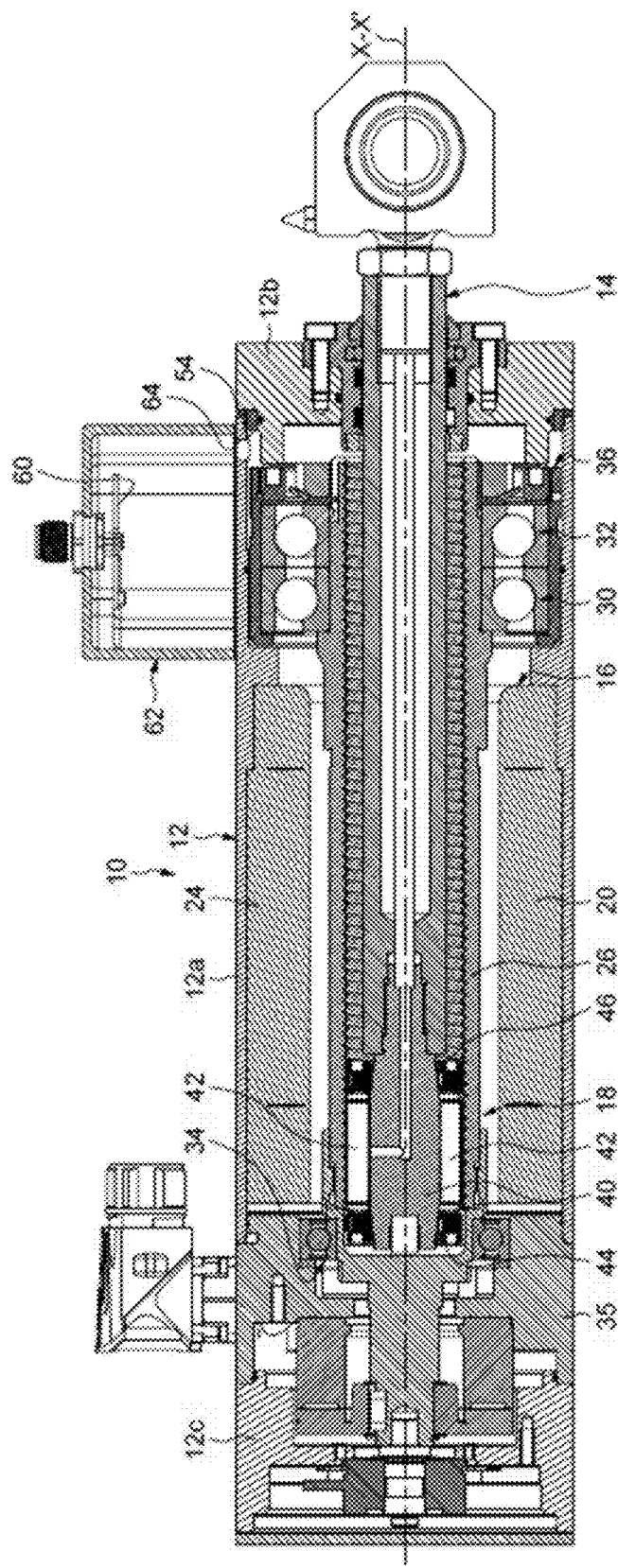
FIG. 1 is a cross-sectional view of an electromechanical cylinder according to one exemplary embodiment of the invention.

In FIG. 1, an electromechanical cylinder denoted by the general numerical reference 10, which has a longitudinal axis X-X', is shown in a position that is assumed to be horizontal.

The cylinder 10 comprises a casing 12, an actuating rod 14 that is able to move axially and is coaxial with the axis X-X', an electric motor 16 and a mechanism 18 for transforming a rotational movement of said motor into a linear translational movement of the rod 14 along the axis X-X'. The mechanism 18 is interposed radially between the electric motor 16 and the actuating rod 14.

The electric motor 16 and the mechanism 18 are entirely housed inside the casing 12. The actuating rod 14 extends axially through the casing 12 and protrudes toward the outside.

The electric motor 16 comprises a stator 20 fastened to the casing 12 and a rotor (not shown). The stator 20 is fastened in the bore 24 of the casing. The rotor is provided with a tubular rotor shaft 26 and a plurality of permanent magnets (not shown) that are supported by said shaft. The rotor shaft 26 extends axially either side of the stator 20. The electric motor 16 may be of the brushless type.

In the exemplary embodiment illustrated, the casing 12 comprises a tubular main body 12a, and a front endplate 12b and a rear endplate 12c that are each fastened to one axial end of said body. The actuating rod 14 extends through the front endplate 12b and protrudes outside the casing 12. The main body 12a delimits the majority of the bore 24 of the casing.

In order to guide the rotor shaft 26 in rotation and support same, the cylinder 10 also comprises two front rolling bearings 30, 32 and a rear rolling bearing 34.

The rear rolling bearing 34 is interposed radially between the rotor shaft 26 and a rear support 35 of the casing that is interposed axially between the body 12a and the rear endplate 12c. The rolling bearing 34 is mounted on the outer surface of the rotor shaft 26 of the electric motor and in a bore of the rear support 35.

As will be described in greater detail below, the cylinder 10 also comprises a housing forming a sleeve 36 inside which are mounted the front rolling bearings 30, 32 and that supports load sensors 38 (FIG. 2) of said cylinder. The sleeve 36 is fastened to the casing 12. The sleeve 36 is interposed radially between the bore 24 of the casing and the bearings 30, 32.

In the exemplary embodiment illustrated, the mechanism 18 is a roller screw mechanism of the inverted satellite roller screw type. The mechanism 18 comprises a screw 40, which is coaxial with the actuating rod 14, fastened to said rod and provided with an external thread (not referenced), and a plurality of longitudinal rollers 42 that are disposed radially between the screw and the rotor shaft 26 of the electric motor. The rotor shaft 26 has a tubular shape. The rotor shaft 26, which is coaxial with the screw 40, comprises an internal thread (not referenced) of which the internal diameter is greater than the external diameter of the thread of the screw 40.

The rollers 42 are identical to one another and in this case are distributed regularly around the screw 40. Each roller 42 extends along an axis parallel to the axis of the screw and comprises an external thread (not referenced) that engages with the external thread of the screw 40 and with the internal thread of the rotor shaft 26. In a manner known per se, each roller 42 comprises, at each end, external teeth that engage with synchronizing teeth of the screw 40, and a journal that extends axially toward the outside from the teeth and is housed in a cavity in one of the spacing rings 44, 46 that are mounted on said screw.

The actuating rod 14 is secured to the screw 40 of the roller screw mechanism. A rotation of the rotor shaft 26 of the electric motor is converted into a translation of the screw 40 and of the actuating rod 14 along the axis X-X'.

As indicated above, the bearings 30, 32 support the rotor shaft 26 of the electric motor and guide same in rotation. The bearings 30, 32 are mounted axially in abutment against one another.

Figure 2:
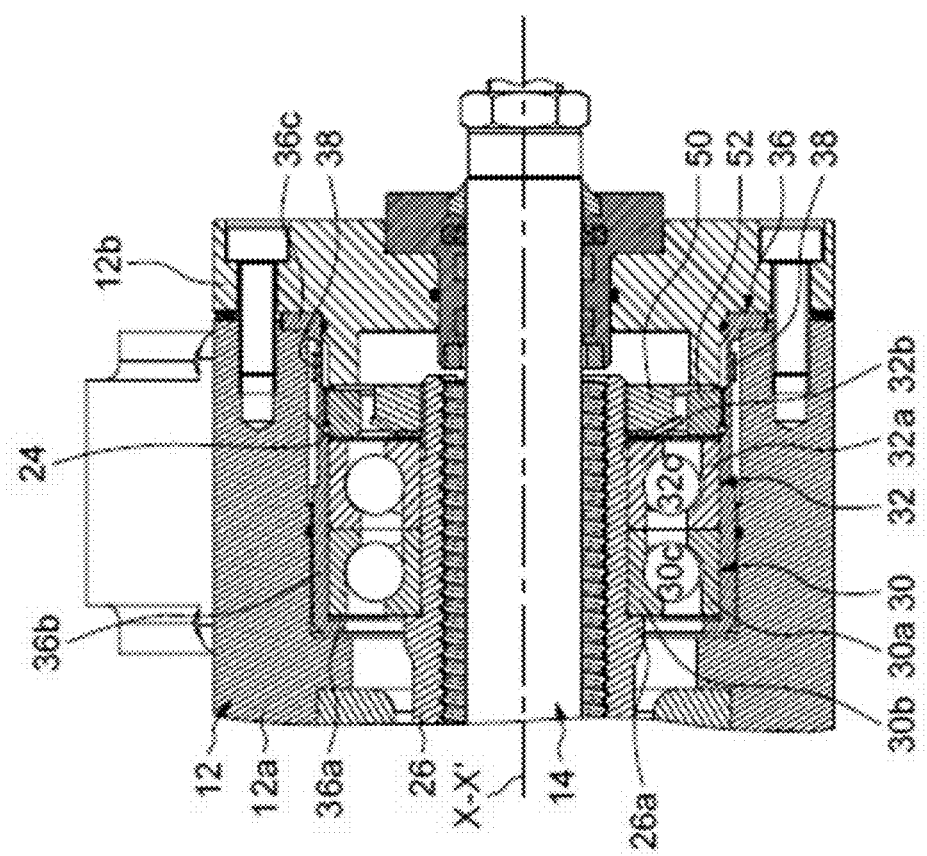
FIG. 2 is a partial cross-sectional view of the electromechanical cylinder in FIG. 1 on another section plane.

As illustrated more visibly in FIG. 2, each bearing 30, 32 comprises an outer ring 30a, 32a, an inner ring 30b, 32b and a plurality of rolling elements 30c, 32c, here in the form of a row of balls, that are disposed radially between raceways formed on said rings. Each bearing 30, 32 also comprises a cage (not shown) for maintaining the regular circumferential spacing of the rolling elements.

The inner ring 30b, 32b of each bearing is mounted on the outer surface of the rotor shaft 26 of the electric motor. The outer ring 30a, 32a of each bearing is mounted inside the bore of the sleeve 36.

The inner ring 30b of the bearing 30 is mounted axially in abutment against a shoulder 26a of the rotor shaft. The outer ring 30a of this bearing 30 is mounted axially in abutment against a radial annular lip 36a of the sleeve 36, in this case by means of a washer (not referenced). Alternatively, it is possible to provide for direct contact between the lip 36a of the sleeve and the outer ring 30a.

In order to axially preload the stack of bearings 30 and 32, the cylinder 10 comprises two locking nuts 50, 52 that are mounted respectively in abutment against the inner ring 32b and the outer ring 32a of the bearing 32, axially on the opposite side from the other bearing 30. A washer (not referenced) is in this case axially interposed between each nut 50, 52 and the bearing 32. Alternatively, it is possible not to provide these washers. The nut 50 is screwed on the outer surface of the rotor shaft 26 of the electric motor. The nut 52 is for its part screwed in the bore of the sleeve 36.

As indicated above, the bearings 30, 32 are mounted inside the sleeve 36 that also supports the load sensors 38. The sleeve 36 is realized in a single piece. The sleeve 36 may for example be made of a metallic material, in particular steel.

The sleeve 36 comprises an axial tubular portion 36b delimiting the bore of said sleeve inside which are mounted the bearings 30, 32. At one axial end, the tubular portion 36b is extended radially toward the inside by the lip 36a. At the opposite axial end, the tubular portion 36b is extended radially toward the outside by a radial annular flange 36c. The flange 36c is gripped axially between the body 12a and the front endplate 12b of the casing. The flange 36c fastens the sleeve 36 to the casing 12.

The load sensors 38 are mounted on the tubular portion 36b of the sleeve. The load sensors 38 are mounted on the tubular portion 36b while being offset axially relative to the bearings 30 and 32, here on the side of the flange 36c. The sensors 38 are not situated radially in line with the region of the tubular portion 36b inside which are mounted the bearings 30, 32. In other words, the load sensors 38 are mounted on the tubular portion 36b in a region thereof that is left free by the bearings 30, 32.

In the exemplary embodiment illustrated, the load sensors 38 are mounted on the outer surface of the tubular portion 36b. Alternatively, it may be possible to provide for the load sensors 38 to be mounted in the bore of the tubular portion 36b. In this instance there are two sensors 38 and they are diametrically opposite. As a variant, it is possible to provide a different number of sensors, for example a single sensor or at least three sensors. In the case of a plurality of sensors, these are preferably regularly spaced apart from one another in the circumferential direction.

The load sensors 38 are strain gauges of which the resistance varies with the axial force applied to the sleeve 36. The load sensors 38 are able to deform so as to be able to measure an axial elongation or a compression of the tubular portion 36b of the sleeve. In the exemplary embodiment illustrated, two opposing planar portions are formed on the tubular portion 36b of the sleeve, for mounting the load sensors 38.

Figure 4:
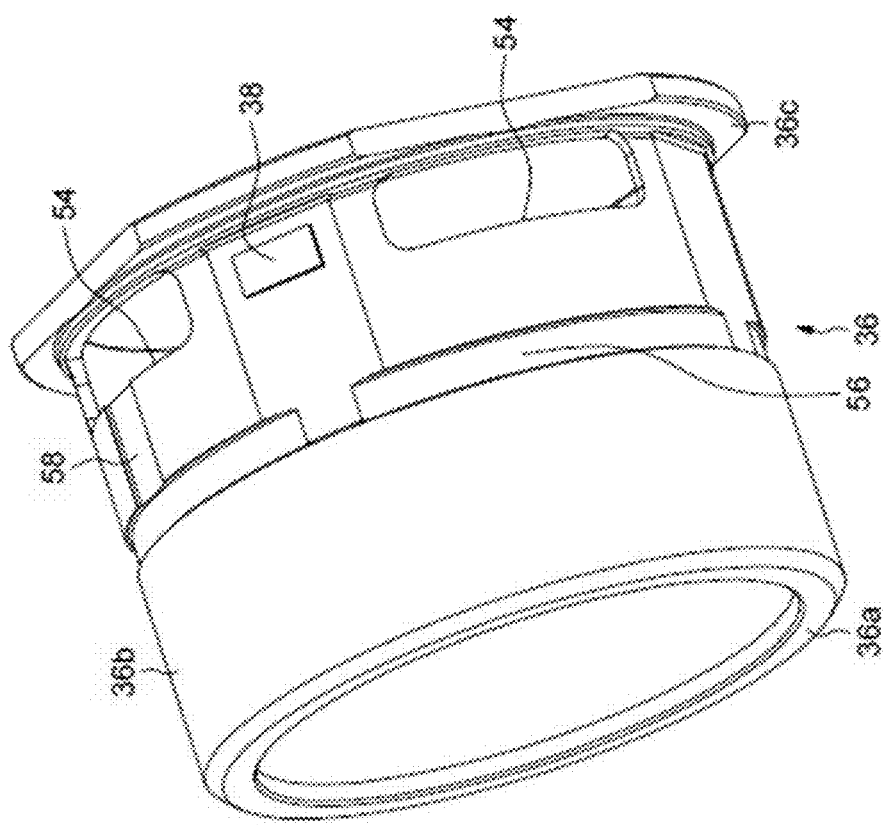
FIG. 4 is a perspective view of a sleeve of the electromechanical cylinder in FIGS. 1 and 2.

As is illustrated more visibly in FIG. 4, through-openings 54 are made in the radial thickness of the tubular portion 36b of the sleeve. These openings 54 are provided in order to promote the deformation of the tubular portion 36b of the sleeve in the region of the load sensors 38. Each load sensor 38 is disposed between two openings 54 that succeed one another in the circumferential direction. The load sensors 38 and the openings 54 are situated in a single radial plane. The load sensors 38 and the openings 54 are here disposed axially in proximity to the flange 36c of the sleeve.

In the exemplary embodiment illustrated, on the tubular portion 36b of the sleeve there are also provided grooves 56, 58 for mounting electrical connection cables (not shown) that connect the load sensors 38 to an electronic card 60 (FIG. 1) of the electromechanical cylinder in order to process the emitted signals. The grooves 56, 58 are formed on the outer surface of the tubular portion 36b of the sleeve. In the exemplary embodiment illustrated, the groove 56 extends in the circumferential direction and is of annular shape. The groove 58 extends for its part axially and opens into the groove 56. The electrical connection cables may be fastened inside the grooves 56, 58 by any appropriate means, for example by adhesive bonding. As a variant, it may be possible not to provide such grooves.

With reference once more to FIG. 1, the electronic card 60 is fastened inside an external housing 62 that is itself fastened to the casing 12. A through-cavity 64 is made in the thickness of the body 12a of the casing for the electrical connection cables to pass.

Figure 3:
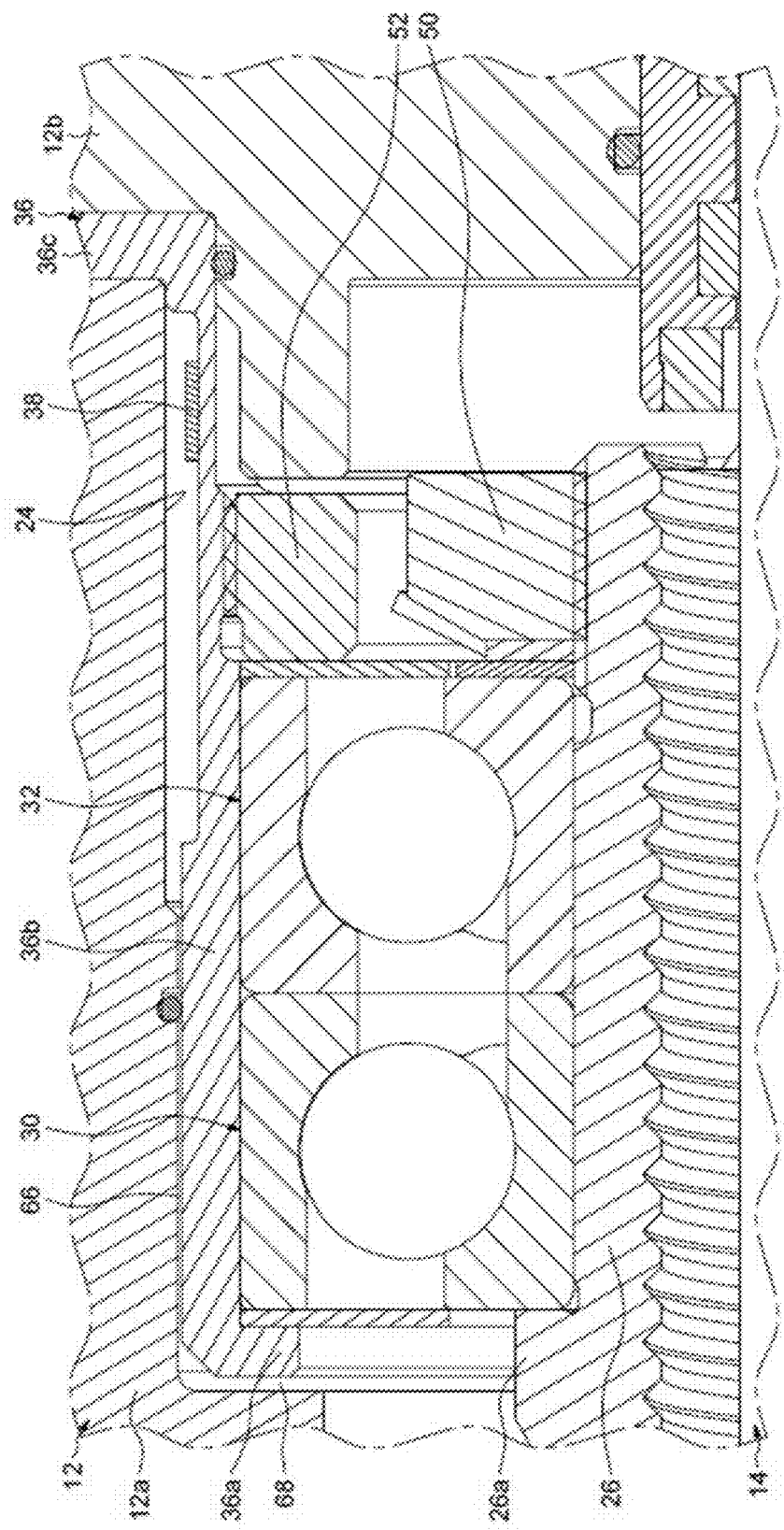
FIG. 3 is a detail view of FIG. 2.

With reference to FIG. 3, an annular radial clearance 66 is provided between the bore 24 of the casing and the tubular portion 36b of the sleeve. There is no direct contact in the radial direction between the tubular portion 36b of the sleeve and the bore 24 of the casing in the regions for mounting the bearings 30, 32 and the load sensors 38. The annular radial clearance 66 is provided here along the entire tubular portion 36b of the sleeve. An axial clearance 68 is also provided between the bore 24 of the casing and the lip 36a of the sleeve.

The tubular portion 36b of the sleeve is mounted in a floating manner relative to the casing 12. No direct contact is provided here in the axial direction and in the radial direction between the tubular portion 36b of the sleeve and the bore 24 of the casing.

In operation, during movements in which the rod 14 of the cylinder pushes a load and works in compression, the force is reacted by the bearing 32 and then by the bearing 30 that is in abutment against the lip 36a of the sleeve, this causing an elongation of the tubular portion 36b of said sleeve, in particular in the region of the load sensors 38 which measure this elongation.

Conversely, during movements in which the rod 14 of the cylinder pulls a load and works in tension, the force is reacted by the bearing 30 and then by the bearing 32 that is in abutment against the nut 52, this causing a compression of the tubular portion 36b of the sleeve that is measured by the load sensors 38.

By virtue of the provision of the intermediate sleeve 36 on which are mounted the load sensors 38, and the positioning of these sensors relative to the bearings 30 and 32, the precision of the measurements obtained is improved, and the same sensitivity is achieved whatever the direction of the force applied to the sleeve and the fastening of the electromechanical cylinder to its external surroundings.

The invention has been illustrated here on the basis of a cylinder comprising bearings 30, 32 of the angular-contact ball bearing type. Alternatively, it may be possible to provide other types of rolling elements, for example rollers.

In the exemplary embodiments illustrated, the rolling elements are mounted in the DB configuration. Alternatively, it may be possible to provide a mounting in the DF configuration.

The invention has been illustrated on the basis of a cylinder comprising bearings mounted axially in abutment against one another and each comprising a single row of rolling elements. As a variant, it may for example be possible to provide a single bearing comprising at least two rows of rolling elements, or else a greater number of axially stacked bearings each comprising one or a plurality of rows of rolling elements.

The invention claimed is:

1. An electromechanical cylinder, comprising:
a casing including a tubular main body, said casing including a front endplate mounted at an end of said tubular main body and a rear endplate mounted at another end of said tubular main body;
an actuating rod extending through said front endplate and mounted to be longitudinally moveable relative to said casing;
an electric motor having a rotating rotor shaft;
a mechanism for transforming a rotational movement of said rotor shaft of said electric motor into a linear translational movement of said actuating rod;
at least one bearing for guiding said rotor shaft of said electric motor in rotation relative to said casing and for supporting said rotor shaft, said at least one bearing being situated axially between said electric motor and said front endplate;
a sleeve fastened to said casing and inside said sleeve is mounted said bearing, said sleeve having a radial flange for fastening said sleeve to said casing, said radial flange being gripped axially between said tubular main body and said front endplate of said casing; and
at least one load sensor mounted on said sleeve while being offset axially relative to said at least one bearing.

2. The cylinder according to claim 1, wherein said casing has a bore formed therein and an annular radial clearance is provided at least between said bore of said casing and a portion of said sleeve on which are mounted said bearing and said at least one load sensor.

3. The cylinder according to claim 1, wherein said sleeve has an axial tubular portion and inside said axial tubular portion is mounted said bearing and said sleeve supports said at least one load sensor.

4. The cylinder according to claim 1, wherein said casing has a bore formed therein and an annular axial clearance is disposed between said bore of said casing and an axially opposite end of said sleeve from said radial flange.

5. The cylinder according to claim 1, wherein said sleeve has through-openings formed therein being made in a radial thickness of said sleeve, said at least one load sensor being disposed between two of said through-openings that succeed one another in a circumferential direction.

6. The cylinder according to claim 1, further comprising at least one electrical connection cable that is connected to said at least one load sensor and mounted on said sleeve.

7. The cylinder according to claim 6, wherein said sleeve has at least one groove formed therein, said electrical connection cable extends at least partially inside said at least one groove formed on said sleeve.

8. The cylinder according to claim 6, further comprising:
an external housing fastened to the casing; and
an electronic card connected to said electrical connection cable and mounted inside said external housing.

9. The cylinder according to claim 1, wherein said mechanism for transforming the rotational movement includes a screw that is secured to said actuation rod and has an external thread, and a plurality of longitudinal rollers that engage with said external thread of said screw and with an internal thread of said rotor shaft of said electric motor.

* * * * *